A. MOORHOUSE.
WIND SHIELD AND TOP CONSTRUCTION.
APPLICATION FILED NOV. 20, 1914.
1,151,961.
Patented Aug. 31, 1915.
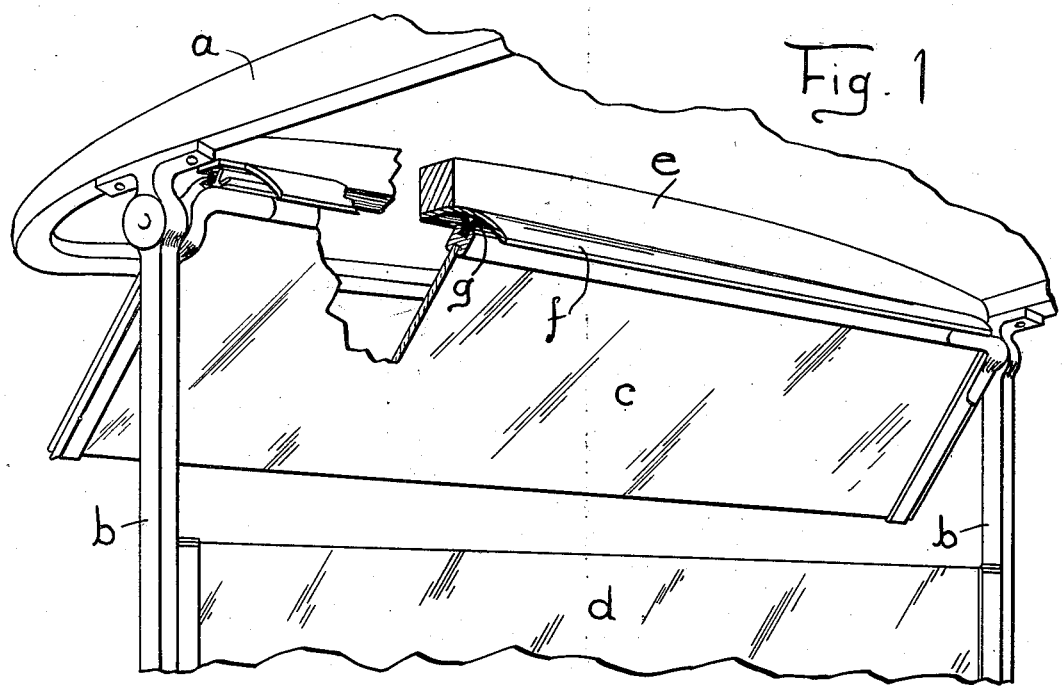
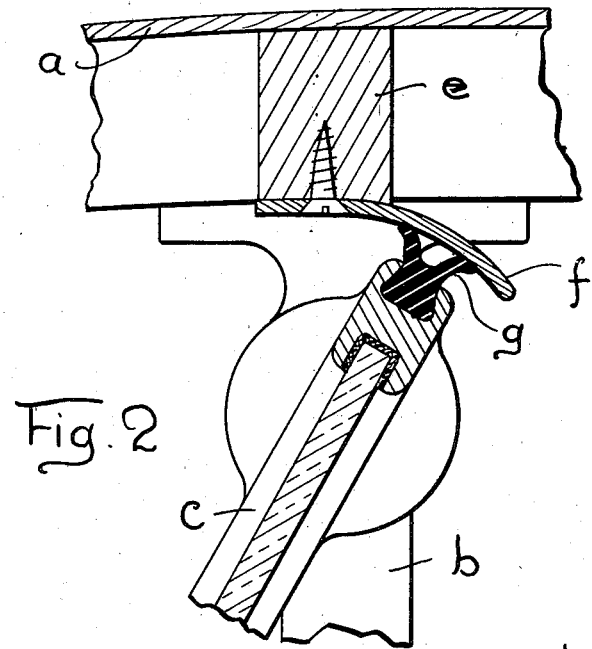
WITNESSES
INVENTOR
Alfred Moorhouse
BY
Raymond A. Parker
ATTORNEY

UNITED STATES PATENT OFFICE.

ALFRED MOORHOUSE, OF DETROIT, MICHIGAN, ASSIGNOR TO HUDSON MOTOR CAR COMPANY, OF DETROIT, MICHIGAN, A CORPORATION OF MICHIGAN.

WIND-SHIELD AND TOP CONSTRUCTION.

1,151,961.     Specification of Letters Patent.      Patented Aug. 31, 1915.

Application filed November 20, 1914. Serial No. 873,090.

*To all whom it may concern:*

Be it known that I, ALFRED MOORHOUSE, a citizen of the United States, residing at Detroit, county of Wayne, State of Michigan, have invented a certain new and useful Improvement in Wind-Shields and Top Construction; and declare the following to be a full, clear, and exact description of the same, such as will enable others skilled in the art to which it pertains to make and use the same, reference being had to the accompanying drawings, which form a part of this specification.

This invention relates to vehicle wind shields and top construction calculated to prevent the weather from beating in at the top of the wind shield.

When it is raining or snowing, it is very often necessary to open the upper windshield panel so as to get a line of vision between the two panels, as the panels frequently become so covered with moisture as to obstruct the vision. When the upper panel is in this tilted position it serves to catch the moisture and the movement of the air generated by the travel of the vehicle tends to force the moisture up the windshield panel and over the top in a spray, to the discomfort of the occupant of the vehicle. Even in fair weather an objectionable draft is often found to take place over the top of the windshield. Such drafts are objectionable because they are apt to strike the head of the occupant of the front seat and give him a cold.

It is the object of this invention to do away with these objectionable characteristics and to provide a weathering suitable to exclude the weather in any position to which the windshield may be tilted.

In the drawings, Figure 1, is a fragmentary perspective of a windshield and top embodying my invention, a part being sectioned to show the construction. Fig. 2, is a vertical section of the same.

The top is designated *a*, the windshield posts as *b*, the top panel of the windshield *c*, the bottom panel *d*. The tops of the windshield posts support the front of the vehicle top. The cross bar *e* extends across the top from one side to the other and serves to help support the weather-excluding fabric. To the bottom of this is screwed a segmental strip *f*, the curvature of which is struck from a center common with the pivotal axis of the upper panel *c*.

The upper panel *c* is pivoted near the top of the windshield posts. Consequently the swinging arc of the upper edge of the panel is short when measured by inches. Therefore it does not require a very wide segmental strip *f* to cover the desired swing of the panel. The upper edge of the panel *c* is provided with a soft rubber strip *g* which wipes the inside of the segmental strip *f*. This rubber strip *g* is preferably in the form of a V in cross section, so as to give flexibility to that portion of the strip which wipes the segmental strip and yet at the same time provide a double insurance against air or moisture getting between the rubber strip and the segmental strip. Of course it is possible that the strip *g* might be constructed of other material than rubber and it will be referred to generically as the weather strip.

What I claim is:

1. The combination with a vehicle top provided with a segmental strip on its under side, of a windshield panel under said segmental strip and pivotally supported independently of said vehicle top and strip, said windshield panel being provided with a flexible upper edge which wipes said segmental strip.

2. The combination with a vehicle top provided with a cross bar, a segmental strip attached to the cross bar, and a windshield panel pivotally supported independently of the cross bar and segmental strip and provided on its upper edge with a flexible strip which wipes the inside of the segmental strip.

3. The combination with a vehicle top provided with a segmental strip attached to the underside thereof, in weather-tight relation, of a pivoted windshield panel, provided on its upper edge with a V-shaped flexible strip which provides two strip portions that wipe the inside of the segmental strip.

In testimony whereof, I sign this specification in the presence of two witnesses.

ALFRED MOORHOUSE.

Witnesses:
    J. L. VETTE,
    ALLAN H. STALL.